April 19, 1966    C. LEIGHTON    3,246,497
ROLLING MILLS

Filed Aug. 2, 1963    4 Sheets-Sheet 3

Inventor
C. Leighton
By
Attorneys

April 19, 1966 C. LEIGHTON 3,246,497
ROLLING MILLS

Filed Aug. 2, 1963 4 Sheets-Sheet 4

Inventor
C. Leighton
By
Holcombe, Wetherill & Brisebois
Attorneys

United States Patent Office 3,246,497
Patented Apr. 19, 1966

3,246,497
ROLLING MILLS
Cyril Leighton, Ebbw Vale, Wales, assignor to Richard Thomas & Baldwins Limited, London, England, a British company
Filed Aug. 2, 1963, Ser. No. 299,553
Claims priority, application Great Britain, Aug. 28, 1962, 33,007/62
13 Claims. (Cl. 72—23)

This invention relates to control systems in which there are a number of rotary members which may be rotated independently of each other, but which must subsequently be restored to a predetermined relationship to each other.

According to this invention, the rotation of each of the rotary members is transmitted to the input member of one of a number of differential units, the output members of which are coupled together by a main control member and the intermediate member of each of which controls an electrical circuit which causes the rotary member to rotate by an amount dependent on the magnitude and direction of rotation of the intermediate member to restore the rotary member to its initial position, the circuit including a delay device by which it is rendered inoperative during the independent rotation of the rotary members and is subsequently brought into operation to reset the members.

The invention may also be applied to the restoration to predetermined relative positions of a number of linearly movable members but in this case each linearly movable member must itself be coupled to a rotary member which produces a rotary analogy of the linear movement and then the rotary members are restored by the mechanism in accordance with the invention and the rotary members in turn restore the linearly movable members.

The differential unit may be electrical e.g., a differential Selsyn or Magslip arrangement, or it may be any form of a mechanical gear chain with a differential arrangement such as an epicyclic gear. But preferably it is a differential gear in the narrow sense of the term such as that used in the back axle of a motor car. In this case the input member of each differential gear is a shaft fitted with a bevel pinion, the output member is a second shaft fitted with a second bevel pinion and the intermediate member is a differential cage carrying planetary pinions. With this form of gear, each circuit which is controlled by the differential cage which forms the intermediate member of the appropriate differential gear includes magnetically operated switches and the cage carries a magnet or magnets forming a polarized arc around its periphery, which arc moves into proximity with the switches as the cage rotates. Rotation of the cage in one direction causes one switch to be closed as the polarized arc moves into proximity with it or causes the two switches to be closed successively to produce a signal which causes the rotary member to make a restoration movement in one direction and rotation of the cage in an opposite direction causes the other switch to be closed or causes the two switches to be closed successively in the reverse order to produce a signal which causes the member to be restored by rotation in an opposite direction. With this arrangement there is no physical contact between the cage or any parts attached to it and the switches. Therefore the drag on the cage is reduced as far as possible. This is desirable to produce a device having low torque requirements, although cams may alternatively be used to operate mechanical switches.

The main control member may consist of a rack with which pinions on the output shafts of the differential gears mesh. It may alternatively be a large pinion with which all the other pinions mesh at intervals around its periphery, but preferably in order to make a compact and practical mechanism, the main control member is a shaft to which each one of the output members of the differential gears or other differential units are coupled by bevel gears.

The steel or other bar or sheet passing through a continuous rolling mill is usually of very considerable length and is held between the rolls of a number of stands of the mill at the same time. The roll gap of each stand in the series is slightly smaller than the gap of the stand before it and the thickness of the bar is therefore continuously reduced. Because of the considerable length of the bar, the temperature of the part being rolled gradually decreases as rolling proceeds. This lowering of the temperature brings about a corresponding increase in the hardness of the bar and therefore the rolling pressure inceases as the rolling of the bar proceeds.

This increase in the pressure on the rolls causes the rolls to move slightly further apart and in consequence the rear end of the rolled bar may be slightly thicker than its front end which is rolled first while the bar is hottest. That is to say, there is a slight taper of the rolled bar from its rear end towards its front end.

It is desirable for the roll gaps to be adjusted to avoid the taper but the passage of the bar through the stands of the mill is too rapid to enable manual adjustments of the electric motors which control the roll gaps to be made at all satisfactorily. It is very desirable therefore, to be able to control the motors of the various stands of the mill automatically in dependence upon some variable which is sensed automatically. This variable may, for example be the thickness of the rolled bar at some point in the rolling operation or it may be the force exerted on the rolls in one of the stands by the bar, as, of course, this force increases as the thickness of the rolled bar at that stand increases.

The variable thickness or force can be used to control the screw-down motors and hence the roll gaps of the stands of the mill as necessary by means of automatic electronic control equipment.

The difficulty that arises however when the rolls of the various stands of a rolling mill are adjusted individually in this way is to reset the roll gaps after they have been indiscriminately altered in dependence upon the variation in thickness of one bar or sheet which has just been rolled. It is very desirable that the rolls should be restored to their initial settings, i.e. reset, ready for the next bar or sheet to be rolled and the time available for doing this may be very short indeed.

To enable the restoration to be brought about, the adjustment of the rolls of each stand is effected by the rotation of one of the rotary members in a control system in accordance with the invention. In the case of the setting of the roll gap, this rotary member is an electric screw-down motor which is commonly provided for moving the rolls towards or away from each other. The rotary member of each stand is turned individually during the rolling of a bar or sheet in the mill to adjust the rolls and all the rotary members are subsequently restored to their initial relationship to each other while there is no bar passing it being at this time that the delay device renders the circuit operative again.

In the particular case where the rotary members are used to adjust the roll gaps in the successive stands of a steel rolling mill and each member consists of an electric screw-down motor which is automatically operated to make individual adjustments to the roll gap between the rolls with which it is associated during the rolling of a strip in the mill, it is the rotation of the screw-down motor itself which is transmitted to the input member of the differential unit. Subsequently when the bar or sheet has passed between the rolls and the circuit is made operative, the circuit causes the screw-down motor to start up again and return the rolls to their initial positions.

As the bar or sheet is passing between the rolls of any one stand in the mill, the screw-down motor may be brought into operation to alter the gap under the control of a thickness or load sensing device. This rotation of the screw-down motor to alter the roll gap brings about a movement of the intermediate member of the corresponding differential gear and produces a stored signal but this has no immediate affect on the mill screws because the circuit which this differential member controls is inoperative. The signal produced which may be electrical, is stored up and then as soon as the rear end of the bar or sheet has passed between the rolls, the circuit is rendered operative and the stored up signal brings the screw-down motor back into operation and causes it to rotate through a number of turns equal and in an opposite direction to the movement which it has previously made and this resets the gap to its original value. In this way, even if a number of the stands of a continuous rolling mill have their gaps altered by the automatic controls in the course of the rolling of a steel bar, they will be returned to their initial settings automatically by the movements of the intermediate members of the differential gears as soon as the rolling of the bar or sheet has been completed.

It is usual in a multi-stand rolling mill having, for example, six stands, for one of the intermediate stands to be a master stand and this may, or may not, have its roll gap altered during the course of rolling of one bar or sheet. This stand has its gap set in dependence upon the required finished thickness of the bar or sheet which may be sensed by an X-ray thickness measuring device which sets the roll gap automatically and it then remains constant. If the finished thickness of the sheet increases towards the rear end as the steel cools, the automatic controls, operated in dependence upon load sensing or other devices will decrease the roll gaps of all the stands except the master stand so that the original conditions at the master stand are restored.

If all the roll gaps are set relative to the roll gap of the master stand, the overall rolling thickness must be able to be adjusted by resetting the roll gaps of all the stands including the master stand, and in this case it is not required to reset the gaps after the bar has been rolled since a new datum and a new relationship between the gaps is established. Now, movement of the main control member will rotate the output members of all the differential gears and if this movement is in the correct ratio (which may be 1:1) and in the opposite sense to the rotation of the input members of the gears, the intermediate members will not be moved and the restoring circuit will not be affected.

Therefore, to enable this resetting to be carried out, according to a further feature of the invention, the rotation of the screw-down motor of the master stand is transmitted directly to the main control member and in an opposite sense to that of the other screw-down motors, without the provision of any differential gear as is the case with the other stands, and in this way rotation of the screw-down motor of the master stand immediately brings about the necessary movement of the main control member to enable the whole datum to be reset. The rotation of the various screw-down motor shafts or other rotary members may be transmitted mechanically to the differential gears but preferably, this transmission is brought about by Selsyn transmitters and Selsyn receivers. One Selsyn transmitter is connected to each motor or other rotary member and one Selsyn receiver, to which the appropriate transmitter is connected electrically, is connected to the input member of each differential gear. The Selsyn receiver may drive the input member of the differential gear directly, but it preferably drives it through a reduction gear. The gear may have a ratio of 100 to 1, for example, so that 100 turns of the screw-down motor brings about 1 turn of the input member of the differential gear. The differential gear may have a 1 to 1 ratio between the input and output members when the intermediate member is stationary and then the intermediate member makes one half revolution when the input member makes a full revolution and the output member is held stationary.

An example of a rolling mill controlled in accordance with the invention, in which the roll gaps are reset automatically, will now be described by way of example with reference to the accompanying drawings, in which.

Figure 1:
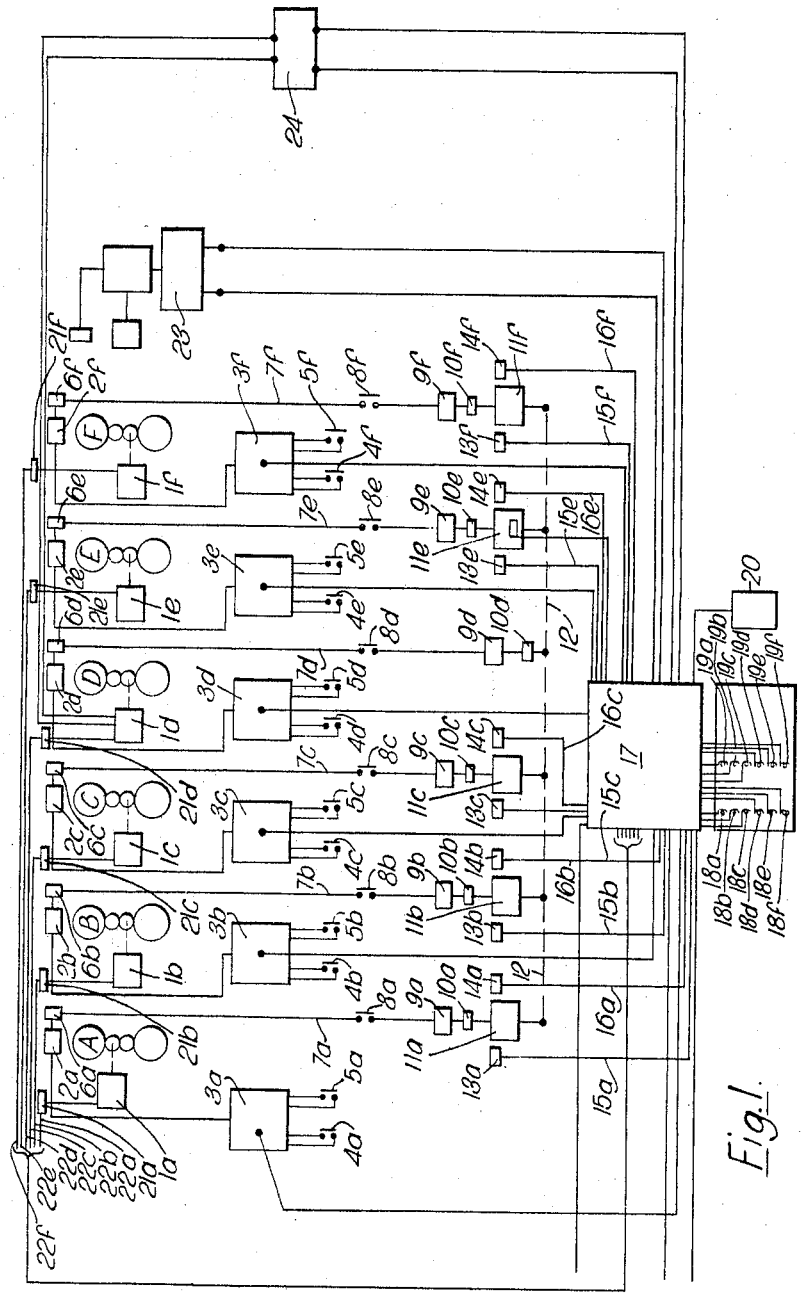
FIGURE 1 is a diagram showing the roll stands of the mill and their controls.

The rolling mill shown diagrammatically in FIGURE 1 has six roll stands A, B, C, D, E and F. Each of these stands has rather similar controls and driving mechanisms and in the following descriptions the same reference numerals are used for the parts of these controls and mechanisms for each of the stands with the appropriate suffix $a$, $b$, $c$, $d$, $e$ and $f$.

The rolls are rotated by main electric driving motors $1a$ to $1f$. The roll gaps through which the strip passes is adjusted by electric screw-down motors $2a$ to $2f$. The screw-down motors $2a$ to $2f$ are controlled by starters $3a$ to $3f$. These starters are operated by relay contacts $4a$ and $5a$ to $4f$ and $5f$ and they also have direct overriding manual controls. Closure of any of the relay contacts $4a$ to $4f$ causes the screw-down motor to raise the upper roll of the appropriate stand and increase the roll gap and closure of any of the relay contacts $5a$ to $5f$ similarly decreases the appropriate roll gap.

Each of the screw-down motors $2a$ to $2f$ has connected to its shaft, a Selsyn transmitter $6a$ to $6f$. These transmitters are connected by cables $7a$ to $7f$ through relay contacts $8a$ to $8f$ to Selsyn receivers $9a$ to $9f$. The output shafts of the Selsyn receivers $9a$ to $9f$ are coupled to reduction gears $10a$ to $10f$. The output shafts of the reduction gears $10a$, $10b$, $10c$, $10e$ and $10f$ are connected to the input shafts of differential gears $11a$, $11b$, $11c$, $11e$ and $11f$. The output shafts of these differential gears are connected through bevel gears (described in detail later with reference to FIGURES 2 to 4 of the drawings) to a common main control shaft 12. The reduction gear $10d$ is connected through a bevel gear directly to the main control shaft 12 instead of being connected through a differential gear. The stand D which has its Selsyn transmitter connected directly to the main control shaft in this way forms a master stand and any alterations made in its gap while the control system is in operation rotates the main control shaft 12 and so alters the datum setting of all the other gaps so that these are changed in proportion to the change in the gap of the master stand.

So long as the relay contacts $8a$, $8b$, $8c$, $8e$ and $8f$ are closed, and the main control shaft 12 remains stationary, all the rotations of the screw-down motors $2a$, $2b$, $2c$, $2e$ and $2f$ will bring about a corresponding rotation but with the appropriate reduced ratio, of the cages which form the intermediate members of the differential gears $11a$, $11b$, $11c$, $11e$ and $11f$.

Rotation of these cages in one direction causes magnetically operated switches $13a$, $13b$, $13c$, $13e$ and $13f$ to produce signals and rotation of the cages in an opposite direction causes a further series of magnetically operated switches $14a$, $14b$, $14c$, $14e$ and $14f$ to produce signals. These signals are transmitted through cables 15a, 15b, 15c, 15e and 15f and cables 16a, 16b, 16c, 16e and 16f to logic circuits contained in a cabinet 17. By means of these logic circuits, the signals are used during restoration to control relays 18a, 18b, 18c, 18e and 18f which operate the contacts 4a, 4b, 4c, 4e and 4f and to relays 19a, 19b, 19c, 19e and 19f which operate the contacts 5a, 5b, 5c, 5e and 5f to increase or decrease the roll gap in all the stands except the stand D.

The relays 18d and 19d which operate the contacts 4d and 5d are also controlled by a push button switch 20 which enables the roll gap of the master stand D to be adjusted under manual control.

When the roll gap of the stand D is altered by operating the switch 20, not only is the motor 2d brought into operation but so also are the motors 2a, 2b, 2c, 2e and 2f by closure of the contacts 4a to 4f and 5a to 5f. These contacts are operated through timing devices so that the motors remain in operation for differing times and all the roll gaps are altered in the required ratio.

The rotation of the motors 2a, 2b, 2c, 2e and 2f causes the Selsyn receivers 9a, 9b, 9c, 9e and 9f to rotate the input shafts of the differential gears 11a, 11b, 11c, 11e and 11f but the rotation of the motor 2d is transmitted through the Selsyn receiver 9d directly to the main control shaft 12 and this rotates the input shafts of the differential gears 11a, 11b, 11c, 11e and 11f in the same ratios as their inputs shafts are rotated by the appropriate Selsyn receivers, but in an opposite direction, so that the cages of the differential gears are not turned and therefore no electrical signals are produced. Therefore, no restoration of the gaps occurs and all are set to a new datum to alter the finished thickness of the rolled strip.

The main driving motors 1a to 1f are fitted with load relays 21a to 21f. When there is a strip between the rolls of a stand the load on the main driving motor is such that the load relay is closed and when there is no strip, the relay is open. These load relays are connected by leads 22a to 22f to the logic circuits in the cabinet 17 and they bring about the delay in resetting the roll gaps until after the tail end of the strip has passed through.

The current consumed by the main driving motor 1d of the master stand D is measured by a pulse generating amplifier 24. The pulse output from the amplifier 24 is fed into the logic circuitry in the cabinet 17.

Figure 2:
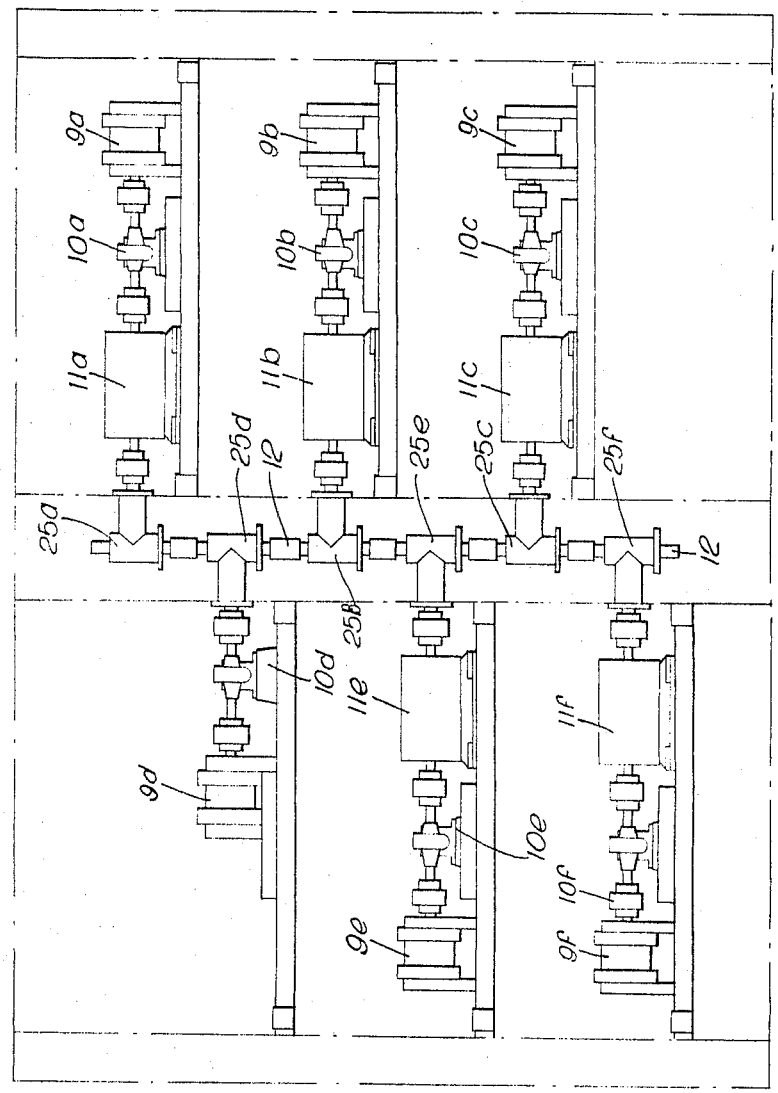
FIGURE 2 is a somewhat diagrammatic front elevation of the differential gears, their driving mechanisms and the main control member.
Figure 3:
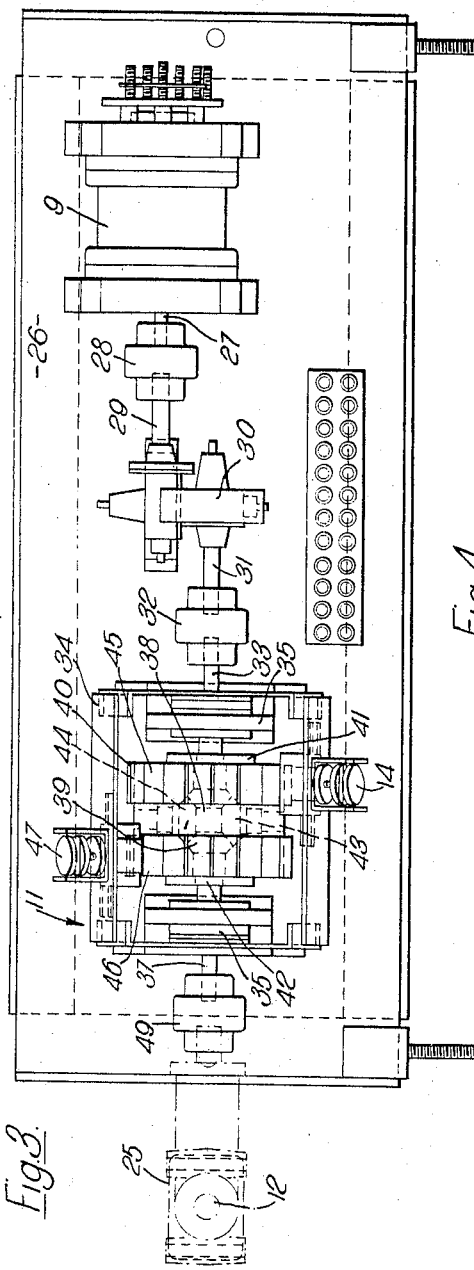
FIGURE 3 is a plan to a larger scale of one of the differential gears and its driving mechanism as shown in FIGURE 2.
Figure 4:
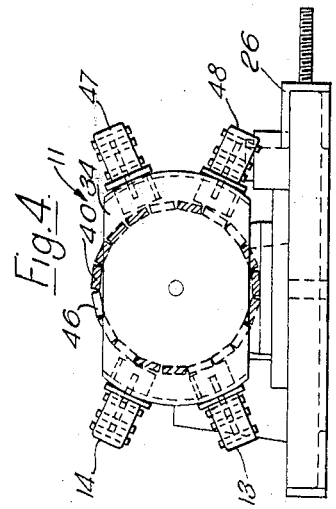
FIGURE 4 is an end elevation of the differential gear shown in FIGURE 3.

The mechanical layout of the differential gears 11a, 11b, 11c, 11e and 11f and their associated parts together with the main control shaft is shown in FIGURES 2 to 4 of the drawings. As is shown in FIGURE 2, the main control shaft 12 is mounted vertically in bearings provided at intervals along its length with bevel gears in housings 25a to 25f. The output shafts of the differential gears 11a, 11b, 11c, 11e and 11f are directly coupled to the appropriate bevel gears and the last bevel gear 11d has the output shaft of the reduction gear 10d directly connected to it. It will readily be seen from this drawing that when the main control shaft 12 is held stationary by the Selsyn receiver 9d acting through the reduction gear 10d and any one of the Selsyn receivers 9a, 9b, 9c, 9e or 9f is rotated, a rotation of the cage of the appropriate differential gear will occur. Rotation of the Selsyn receiver 9d however brings about a direct rotation of the main control shaft 12 and this in turn brings about a rotation of the cages of the five differential gears. All the differential gears together with the Selsyn receivers and connections to the bevel gears are identical and one of them is illustrated in FIGURES 3 and 4 of the drawings. The whole assembly is mounted on a base plate 26 at one end of which is the Selsyn receiver 9 which is a standard piece of equipment and will not be described in detail. The output shaft 27 of the Selsyn receiver 9 is coupled by a coupling 28 to an input shaft 29 of a worm reduction gear 30. The output shaft 31 of this reduction gear is coupled by a further coupling 32 to an input shaft 33 of the differential gear 11. The differential gear 11 comprises a housing 34 having at its right-hand end as seen in FIGURE 3 a bearing 35 which supports a shaft 33 and its left-hand end a further bearing 36 which supports an output shaft 37. The input shaft 33 has a pinion 38 fixed on its end and a similar pinion 39 is fixed upon the end of the output shaft 37. A cylindrical casing 40 forming a cage is pivotally mounted by bearing 41 and 42 on the shafts 33 and 37 and this cage supports two planetary bevel gears 43 and 44. Mounted on the outside of the cage 40 are two rings of bars 45 and 46. Some of the bars 45 and 46 are magnetic with their North and South poles adjacent each other and arranged in the axial direction. These magnetic bars form polarized arcs around the cage 40. These arcs are shown without cross-hatching in FIGURE 4.

Fixed to the casing 34 are magnetic proximity switches 13 and 14 and these are aligned with the ring of bars 45. Two similar switches 47 and 48 are fixed to the housing 34 in alignment with the ring of bars 46. This second pair of switches is not used in the example described but may be connected into the control circuit to provide other position indicating signals. The switches 13 and 14, 47 and 48, are ferroresonant devices which change their state when the polarized arcs in the rings 45 and 46 move into proximity with them. As the cage 40 rotates in a clockwise direction as seen in FIGURE 4, that is the direction which is produced by the raising of the roll to increase the roll gap, the switch 13 is closed first and further rotation subsequently closes the switch 14 and when the roll gap is screwed down, the cage 40 rotates in a counter-clockwise direction as seen in FIGURE 4, the switch 14 is closed first and further rotation if any subsequently closes the switch 13.

The output shaft 37 of the differential gear 11 is connected by a coupling 49 to the shaft of the bevel gear within the housing 25.

The operation of the control system described is as follows:

To roll a hot billet into a strip of the required thickness, the starters 3a to 3f are operated to adjust the roll gaps of the stands A to F to appropriate values which are calculated in dependence upon the initial thickness of the billet, the final thickness of the strip required and upon other factors. During this operation the contacts 8a to 8f are all opened so that the rotation of the Selsyn transmitters 6a to 6f is not transmitted to the receivers. These contacts then close and the setting so established becomes the datum.

If the thickness of the bar or plate leaving the last roll gap of the stand F is outside the limits which can be corrected by the control system, the roll gap of the master stand D and those of the other stands are adjusted by a signal transduced from an X-ray thickness sensing device 23 (see FIGURE 1) and a new datum is established because the cages 40 do not move for the reasons already described.

If, on the other hand, the average thickness of the strip leaving the last roll gap is within the limits, then the roll gap of stand D will be unchanged. Any slight increase in the thickness of the strip passing through stand D as the strip cools is sensed by thickness or roll separating force transducers and the roll gaps of the stands A, B, C, E and F are varied to counteract the changes that are due to temperature variations in the slab and thus restore the original conditions at stand D. The rotation of the screw-down motors 2a, 2b, 2c and 2f will bring about corresponding rotations of the cages of the differential gears 11a, 11b, 11c, 11e and 11f. The magnitude and direction of rotation will be stored during the processing of the bar, and will not produce any resetting until the relays 21a to 21f operate after the strip has left the various stands.

On completion of the passage of the tail end of the bar through each one of the stands, an appropriate relay 21a to 21f is operated and this causes the signals stored in the memory circuits to be released and become operative. These signals then close the appropriate relays 18a, b, c, e or f and these close the contacts 4a, b, c, e or f and start the screw-down motors to return the roll gaps to the values which they had before the cages of the differential gears made any rotations at all. Generally speaking the roll gaps will be decreased during the course of rolling of a billet and therefore it is the contacts 4a, b, c, e or f which will be closed to increase the roll gap as soon as rolling of the billet is complete and before rolling of the next billet starts although of course in some circumstances it may be possible for the roll gaps to be increased during rolling and subsequently be decreased.

If at any time it is necessary to reset all the roll gaps together maintaining the relative settings of the roll gaps to each other, all that is necessary is to operate the push button control 20 to set the roll gap of the stand D, which will cause the main control shaft 12 to rotate and adjust the datums of the roll gaps of all the stands as previously described.

The reduction gears 10a to 10f can be so arranged as to give a change in all roll gaps equal to the change in the roll gap of stand D by using reductions of equal value, say 100 to 1, or a proportional change can be obtained by using reduction gears of different values, e.g. 25 to 1—50 to 1—75 to 1—100 to 1—125 to 1 and 150 to 1 would produce a change having a "wedge" characteristic.

Figure 5:
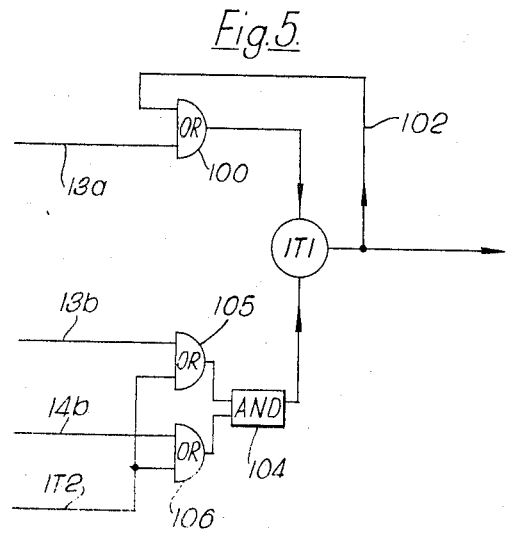
FIGURE 5 illustrates a memory circuit used in the logic unit.

The manner of storing the magnitude and direction of the run-down of the screw-down motor of the first stand A so that it can subsequently be restored is as follows, corresponding apparatus being provided for each of the second, third, fifth and sixth stands. The proximity switches 13 and 14 co-operate with the magnetic arcs on the differential cage. They are of known form and employ no electrical contacts but instead form part of a circuit utilising a ferro-resonant effect to give a sharp change in output when a magnetic arc on the differential cage comes into close proximity with the switch. Normally the magnetic arcs are in a neutral position relative to the proximity switches 13 and 14 and both of these switches are open. When a screw-down motor for a given mill is energised to compensate for a thermal run-down effect the differential cage corresponding to that motor starts to turn in one direction or the other, usually in a direction to reduce the gap between the rolls of the mill. If the cage rotates in an anticlockwise direction in FIGURE 4 the switch 14 will operate and this causes a signal to be applied to a reset "up" memory circuit of the kind shown in FIGURE 5. In FIGURE 5 the signal from the switch 13 is applied along a conductor 13a to an "OR" gate 100. This signal passes through the "OR" gate to a trigger circuit IT1 and changes the condition of the latter. As the output of the trigger circuit is fed back by way of conductor 102 to the "OR" gate 100 this change in the condition of the trigger circuit will remain until the trigger circuit is reversed by the application of an inhibiting signal to a further input terminal by way of conductor 103. The inhibiting signal is provided by an "AND" gate 104 when it receives a signal from each of two "OR" gates 105 and 106. The "OR" gate 105 receives as input signals a signal on conductor 13b representing the absence of an output from switch 13 and a further signal which is present only when a trigger circuit IT2 (which is similar to the trigger circuit IT1 but represents movement of the cage in the opposite direction) is triggered. In a similar manner the "OR" gate 106 receives input signals from the trigger circuit IT2 and also, by way of conductor 14b, from a circuit which provides a signal only when the switch 14 is open.

It will be seen that the "up" trigger circuit IT1, once operated by way of the conductor 13a, will remain operated until either the switches 13 and 14 are both in the open condition, but IT1 trigger would be prevented from operating if the presence of the IT2 signals indicated that a "down" memory was already present. The magnetic arcs on the cage are such that, once the cage starts to rotate, at least one of the switches is energised until the cage completes a part rotation determined by the length of the magnetic arc, which is the limit of the cage movement for a thermal run-down compensating operation.

A similar memory circuit is provided to store information representing the opposite direction of movement of the cage and this pair of memory circuits is repeated for each of the stands A, B, C, E and F.

Figure 6:
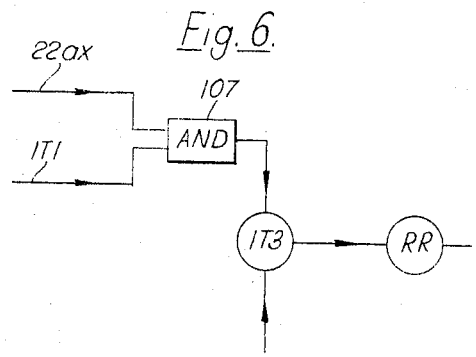
FIGURE 6 shows a trigger circuit used in the logic unit.

The direction information is stored by the memory circuit until the bar leaves the stand in question. When this happens a "raise" relay RR (FIGURE 6) is energised and this serves to operate the screw-down motor for the first stand in the opposite direction to restore the gap to its previous value. The circuit for operating the "raise" relay is a trigger circuit IT3 fed from an "AND" gate 107 having one input 22ax derived from the load cell switch 21 and representing the absence of a bar in the stand, and a further input connection representing the operated condition of the direction-memory trigger circuit IT1. The restoring rotation of the motor continues until the memory trigger IT1 is released as a result of the return of the magnetic arcs to the neutral position and the simultaneous absence of a proximity signal from switches 13 and 14. The magnitude of the required restoration movement is thus stored by the movement of the differential cage from the datum position defined by the switches 13 and 14. Again, a similar circuit is provided for the "lower" relay, which is required to operate when the restoring movement is to be in the opposite direction.

I claim:

1. A control system including a plurality of independently rotatable rotary members and means for restoring said rotary members to a predetermined relationship to each other after independent rotation thereof, said restoring means comprising a plurality of differential units each including an input member, an output member and an intermediate member which is movable by differential movement of said input and output members, means for transmitting the rotation of each of the said rotary members to one of said input members, a main control member coupling together said output members, a plurality of electrical circuits controlled one by each of said intermediate members, each of said circuits being operative to cause one of said rotary members to rotate by an amount dependent on the magnitude and direction of movement of said intermediate member by said input member to restore said rotary member to an initial position, and a delay device in each of said circuits rendering that circuit inoperative during independent rotation of said rotary members and subsequently rendering that circuit operative to reset said members.

2. A control system as claimed in claim 1, further comprising an additional rotary member and means transmitting the rotation of said additional rotary member directly to said main control member whereby rotation of said additional rotary member causes said output members and with them said intermediate members of all said differential units to rotate and thus brings about an adjustment of the other rotary members.

3. A control system as claimed in claim 1, wherein said means for transmitting the rotation of said rotary members to said input members comprises a plurality of Selsyn transmitters and Selsyn receivers, one of said Selsyn transmitters being connected to each of said rotary members and one of said Selsyn receivers being connected to each of said input members and means connecting each of said Selsyn transmitters to one of the said Selsyn receivers.

4. A control system as claimed in claim 1, wherein each differential unit is a differential gear, said input member comprising a shaft and a bevel pinion fitted on said shaft, said output member comprising a second shaft and a second bevel pinion fitted on said second shaft and said intermediate member comprising a differential cage and planetary pinions carried on said cage.

5. A control system as claimed in claim 4, wherein said main control member is a further shaft, and further comprising bevel gears fixed to said further shaft and further bevel gears fixed to said second shaft, said bevel gears and said further bevel gears meshing with each other.

6. A control system as claimed in claim 4, in which each of the said circuits includes magnetically operated switches and further comprising magnets mounted around the periphery of each of said cages to form polarised arcs around said periphery, said polarised arcs moving into proximity with said switches as said cage rotates, rotation of said cage in one direction causing one of said switches to be closed or both of said switches to be closed in succession as the polarised arc moves into proximity with said switch or switches to produce a signal which causes said rotary member to be rotated in one direction and rotation of said cage in an opposite direction causing the other of said switches to be closed or both said switches to be closed in the reverse order to produce a signal which causes said rotary member to be rotated in an opposite direction.

7. In a multi-stand rolling mill including rolls, means including a plurality of independently rotatable rotary members for adjusting said rolls and means for individually rotating said members during rolling of a strip in said mill, the improvement which comprises means for restoring said rotary members and with them said rolls to a predetermined relationship to each other on completion of the rolling of said strip, said restoring means comprising a plurality of differential units each including an input member, an output member and an intermediate member which is movable by differential movement of said input and output members, means for transmitting the rotation of each of the said rotary members to one of said input members, a main control member coupling together said output members, a plurality of electrical circuits controlled one by each of said intermediate members, each of said circuits being operative to cause one of said rotary members to rotate by an amount dependent on the magnitude and direction of movement of said intermediate member by said input member to restore said rotary member to an initial position, and a delay device in said circuit rendering said circuit inoperative during the passage of said strip through said mill and subsequently rendering said circuit operative to reset said members and said rolls after said strip has passed between them.

8. In a multi-stand rolling mill including a plurality of stands each including rolls defining a roll-gap between them, an electric screw-down motor including a rotary part for adjusting said roll gap and automatic means for individually operating said motors and rotating said rotary parts thereof to adjust said roll gap during rolling of a strip in said mill, the improvement which comprises means for restoring said rotary parts of said screw-down motors and with them said roll gaps to a predetermined relationship to each other on completion of the rolling of said strip, said restoring means comprising a plurality of differential units each including an input member, an output member and an intermediate member which is movable by differential movement of said input and output members, means for transmitting the rotation of each of the said rotary parts to one of said input members a main control member coupling together said output members, a plurality of electrical circuits controlled one by each of said intermediate members, each of said circuits being operative to cause one of said rotary parts to rotate by an amount dependent on the magnitude and direction of movement of said intermediate member by said input member to restore said rotary part to an initial position, and a delay device in said circuit rendering said circuit inoperative during the passage of said strip through said mill and subsequently rendering said circuit operative to reset said members and said rolls after said strip has passed between them.

9. A mill according to claim 8, further comprising an additional screw-down motor with a rotary part and means transmitting the rotation of said additional rotary part directly to said main control member whereby rotation of said additional rotary part causes said output members and with them said intermediate members of all said differential units to rotate and thus brings about an adjustment of the other rotary parts and the other roll gaps.

10. A mill according to claim 8, wherein said means for transmitting the rotation of said rotary parts to said input members comprises a plurality of Selsyn transmitters and Selsyn receivers, one of said Selsyn transmitters being connected to each of said rotary parts and one of said Selsyn receivers being connected to each of said input members and means connecting each of said Selsyn transmitters to one of said Selsyn receivers.

11. A mill according to claim 8, wherein each differential unit is a differential gear, said input member comprising a shaft and a bevel pinion fitted on said shaft, said output member comprising a second shaft and a second bevel pinion fitted on said second shaft and said intermediate member comprising a differential cage and planetary pinions carried on said cage.

12. A mill according to claim 11, wherein said main control member is a further shaft, and further comprising bevel gears fixed to said further shaft and further bevel gears fixed to said second shafts, said bevel gears and said further bevel gears meshing with each other.

13. A mill according to claim 11, in which each of the said circuits includes magnetically operated switches and further comprising magnets mounted around the periphery of each of said cages to form polarised arcs around said periphery, said polarised arcs moving into proximity with said switches as said cage rotates, rotation of said cage in one direction causing one of said switches to be closed or both of said switches to be closed in succession as the polarised arc moves into proximity with said switch or switches to produce a signal which causes said rotary part to be rotated in one direction and rotation of said cage in an opposite direction causing the other of said switches to be closed or both said switches to be closed in the reverse order to produce a signal which causes said rotary part to be rotated in an opposite direction.

References Cited by the Examiner

UNITED STATES PATENTS

| 2,676,289 | 4/1954 | Wulfsberg et al. | 318—8 |
| 2,806,191 | 9/1957 | Montrose-Oster | 318—8 |
| 2,959,992 | 11/1960 | Mitchell | 80—56 |
| 3,186,200 | 6/1965 | Maxwell | 72—21 XR |

CHARLES W. LANHAM, *Primary Examiner.*